United States Patent [19]

Schmidt, Jr. et al.

[11] Patent Number: 4,460,728

[45] Date of Patent: Jul. 17, 1984

[54] HOT MELT ADHESIVE COMPOSITIONS

[75] Inventors: Robert C. Schmidt, Jr., Port Murray; Stanley J. Decowski, Jr.; Paul P. Puletti, both of Glen Gardner, all of N.J.

[73] Assignee: National Starch and Chemical Corporation, Bridgewater, N.J.

[21] Appl. No.: 470,797

[22] Filed: Feb. 28, 1983

[51] Int. Cl.³ .............................................. C08L 93/04
[52] U.S. Cl. ...................................... 524/271; 524/77; 524/489; 524/523; 524/524; 428/284; 428/286; 428/913; 604/370
[58] Field of Search ............... 524/523, 524, 77, 487, 524/271; 428/284, 286; 604/370

[56] References Cited

U.S. PATENT DOCUMENTS 3,600,347 8/1971 Godar, Jr. ........................... 260/27
3,849,353 11/1974 Taft ..................................... 260/27
3,982,051 9/1976 Taft ..................................... 427/207
4,299,745 11/1981 Godfrey ......................... 260/28.5 AV

FOREIGN PATENT DOCUMENTS 1044756 10/1976 United Kingdom ............... 524/523

Primary Examiner—Joseph L. Schofer
Assistant Examiner—J. M. Reddick
Attorney, Agent, or Firm—Edwin Szala; Ellen T. Dec

[57] ABSTRACT

Hot melt adhesive compositions are prepared from ethylene copolymers, atactic polypropylene, tackifying resins and optional additives. The adhesives are non-pressure sensitive and are characterized by high cohesive strength, strong tack, and good heat, creep and cold resistance. In accordance with the preferred embodiment, the adhesives are formulated so as to be particularly adaptable for use in the construction of disposable diapers of the multi-line construction variety.

15 Claims, No Drawings

HOT MELT ADHESIVE COMPOSITIONS

The present invention relates to hot melt adhesives useful for assembling disposable items such as diapers, hospital gowns, bed pans, sanitary napkins and the like, and to the items assembled therewith. More particularly, the invention is directed to non-pressure sensitive hot melt adhesive compositions comprising a blend of an ethylene copolymer, atactic polypropylene and a tackifying resin.

Hot melt adhesives heretofore used in the manufacture of disposable items have been based primarily on either atactic polypropylene or copolymers of ethylene and vinyl acetate. Additionally, U.S. Pat. No. 4,299,745 teaches a hot melt adhesive prepared from a blend of an ethylene vinyl acetate copolymer, tackifier resin, microcrystalline wax and a specific modified polyethylene.

SUMMARY OF THE INVENTION

We have now found that hot melt adhesives prepared from an ethylene copolymer, atactic polypropylene, tackifying resins and optional additives provide adhesives characterized by high cohesive strength, strong tack, good heat, creep and cold resistance as well as permitting high processing speeds. Moreover, due to the relatively high levels of atactic polypropylene which can be tolerated in the adhesives, the resulting adhesives are produced at lower cost than conventional adhesives based on ethylene copolymers but without the processing problems normally associated with polypropylene based adhesives.

The present invention is therefore directed to a non-pressure sensitive hot melt adhesive composition consisting essentially of:

(a) 10 to 40% by weight of a copolymer of ethylene with vinyl acetate or an alkyl acrylate wherein the vinyl acetate or alkyl acrylate comprises 5 to 25% by weight of the copolymer;

(b) 10 to 40% by weight of atactic polypropylene; the weight ratio of atactic polypropylene to ethylene copolymer being between 0.5 and 2.5;

(c) 20 to 50% by weight of a compatible tackifying resin;

(d) 0 to 15% by weight of plasticizing oil;

(e) 0 to 15% by weight of a petroleum derived wax; and (f) 0 to 1.5% stabilizer.

Preferably, the hot melt adhesives of the present invention are characterized by viscosities within the range of 1,000 to 10,000 cps. at 300° F.; a minimum open time of 5 seconds; and a minimum tensile strength at 100% elongation (measured according to ASTM D412-51T) of 60 psi at room temperature and 30 psi at 100° F.

DETAILED DESCRIPTION OF THE PREFERRED EMBODIMENTS

When ethylene vinyl acetate is used as the copolymer, from about 5 to about 25, preferably 10 to about 18, weight percent of vinyl acetate is used in the copolymer. These copolymers will have melt indices of about 10 to 500.

In the cases where copolymers of ethylene and alkyl acrylate(s) are employed, the alkyl acrylates employed are the alkyl acrylates containing from 1 to about 18 carbon atoms in the alkyl radical and preferably from 1 to about 6 carbon atoms. Illustrative of the acrylates found suitable are ethyl acrylate, propyl acrylate, pentyl acrylate, 2-ethylhexyl acrylate, decyl acrylate and the like. The alkyl acrylate component is also limited to an amount of about 5 to 25 weight percent of the copolymer since higher levels lead to rubbery, tacky, elastomeric products which are unsatisfactory herein.

The particular ethylene-lower alkyl acrylate copolymer most advantageously employed herein is an ethylene-ethyl acrylate copolymer having about 18 percent by weight of ethyl acrylate, about 82 percent by weight of ethylene, and a melt index (gms./10 min.) of about 15 to 25. It is a solid at room temperature and is available as "Bakelite DPDA-9169" from Union Carbide Corporation.

In addition to the two-component ethylene copolymers, copolymers of ethylene and alkyl acrylates or, copolymers of ethylene and vinyl acetate containing small amounts, on the order of 0.001 to 3% by weight, of a third or fourth comonomer are also suitable for use in the compositions of this invention. Thus, copolymers with small amounts of adhesion-promoting monomers such as acrylic acid, methacrylic acid, itaconic acid, acrylamide, beta-dimethylaminoethyl methacrylate, beta-hydroxyethyl acrylate and other monomers having carboxyl, amido, amino or hydroxyl groups can also be used.

The atactic (amorphous) polypropylene used herein is made by the stereospecific polymerization of polypropylene. Polymerization occurs in the presence of a catalyst comprising a coordination complex of a transition metal halide with an organometallic compound. The resulting atactic polypropylene usually represents from about 5 to 15 weight percent of the polymerization product, the remainder being isotactic (crystalline) polypropylene. The solid atactic polypropylene, used herein, has a weight average molecular weight of 8,000 to about 23,000 and more particularly from about 10,000 to 15,000 and a softening point of about 250° F. It is soluble in boiling pentane, hexane, heptane and other hydrocarbons. It is also required that the atactic polypropylene employed contain little or no residue of the isotactic portion of the polypropylene polymerization product. Especially useful herein is the atactic polypropylene marketed by Hercules Inc. under the tradename Afax 600.

The tackifying resins useful in the adhesive compositions of the invention can be hydrocarbon resins, synthetic polyterpenes, rosin esters, natural terpenes, and the like. More particularly, the useful tackifying resins include (1) natural and modified rosins such, for example, as gum rosin, wood rosin, tall-oil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (4) phenolic modified terpene resins such, for example, as the resin product resulting from the condensation, in an acidic medium, of a bicyclic terpene and a phenol; (5) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (6) aromatic petroleum hydrocarbon resins and the hydrogenated derivatives thereof; and (7) alicyclic petroleum hydrocarbon resins and the hydrogenated derivatives thereof. Mixtures of two or more of the above described tackifying resins may be required for some formulations.

Among the applicable stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris (3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tertbutylphenol; 6-(4-hydoxyphenoxy)-2,4-bis(n-octylthio)-1,3,5-triazine; 2,4,6-tris-(4-hydroxy-3,5-di-tert-butylphenoxy)-1,3,5-triazine; di-n-octadecyl 3,5-di-tert-butyl-4-hydroxy-benzylphosphonate; 2-(n-octylthio)ethyl 3,5-di-tert-butyl-4-hydroxybenzoate; and sorbitol hexa[3-(3,5-di-tert-butyl-4-hydroxyphenyl)propionate].

The performance of these antioxidants may be further enhanced by utilizing, in conjunction therewith known synergists such, for example, as thiodipropionate esters and phosphites, particularly useful is distearylthiodipropionate.

These stabilizers, if used, are generally present in amounts of about 0.1 to 1.5 weight percent, preferably 0.25 to 1.0%.

Various plasticizing or extending oils may also be present in the composition in amounts of up to about 15%, preferably 0.2 to 10%, by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more preferably, less than 15% by weight of the oil). Alternatively, the oil may be totally nonaromatic. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

Various petroleum derived waxes may also be used in amounts less than about 15% by weight of the composition in order to impart fluidity in the molten condition of the adhesive and flexibility to the set adhesive, and to serve as a wetting agent for bonding cellulosic fibers. By the term "petroleum derived wax" is meant both paraffin and microcrystalline waxes having melting points within the range of 130°–205° F.

The adhesive compositions of the invention are prepared by blending the components in the melt at a temperature of about 130°–200° C. until a homogeneous blend is obtained, approximately 2 hours. Various methods of blending are known to the art and any method that produces a homogeneous blend is satisfactory.

The adhesive may be used to bond together a wide variety of substrates. In particular, it has been found that the hot melt adhesive is useful in bonding substrates including polyethylene or polypropylene to non-wovens such as are conventionally employed in disposable assemblies. More particularly, the hot melt adhesives of the invention are suitable for use in the bonding of polyethylene films to non-woven substrates in the production of multi-line diapers. The latter class of diaper construction presents unique problems for the adhesive formulator since it requires the application of the adhesive in the form of a number of very fine parallel longitudinal stripes in order to bond the substrates thus requiring each line of adhesive to possess exceptionally high bonding properties. Furthermore, the adhesives used heretofore for multiline constructions have been semi-pressure sensitive in order to provide the required degree of open time and to achieve adequate bonding. These adhesives have, however, been soft and sticky and therefore lacked cohesive strength resulting in loss of bonding during storage or transport at elevated temperatures. By formulating hot melt adhesives using higher levels of plasticizing oil relative to wax, applicants have been able to achieve superior bonding properties even at elevated temperatures with satisfactory open time using the non-pressure sensitive hot melts of the present invention. Thus, compositions within the scope of the present invention, which are particularly suitable for use in the construction of multi-line diapers consist essentially of: 20 to 30% by weight of the ethylene copolymer, 20 to 40% of the atactic polypropylene, 35–50% of the tackifier, 5–15% of the plasticizing oil, 0–5% wax and 0 to 1.5% stabilizer. There compositions are further characterized by viscosities of 2000 to 8000 cps. at 300° F., minimum open time of 10 seconds, minimum bonding temperature of 160° F. and minimum tensile strength at 100% elongation at room temperature of 60 psi and at 100° F. of 30 psi.

This invention can be further illustrated by the following examples of preferred embodiments thereof, although it will be understood that these examples are included merely for purposes of illustration and are not intended to limit the scope of the invention unless otherwise specifically indicated.

EXAMPLE I

Thirty grams of Afax 600 atactic polypropylene were thoroughly blended with 0.5 grams butylated hydroxy toluene (BHT) and 0.1 gram distearythiodipropionate (DSTDP) at 300° F. When the blend was homogeneous, 23 grams Bakelite DPDA-9169 ethylene-ethyl acrylate copolymer was added. Once this blend becomes homogeneous, 38 grams of Nirez 1100, a polyterpene tackifying resin, were added with heating continued at 300° F.±10°. To the resultant homogeneous mass was added 8 grams polybutene and 1 gram paraffin wax. The blend had a softening point of approximately 212° F. and a density of 7.9 lbs./gal. Viscosity measurements using a Brookfield Thermosel Viscometer were as follows:

| Temperature °F. | Viscosity in cps. |
|---|---|
| 350 | 1,600 |
| 325 | 2,200 |
| 300 | 3,250 |
| 275 | 6,500 |
| 250 | 13,000 |

The resulting adhesive had a minimum open time of 10 seconds and a minimum bonding temperature of 160° F.

In order to compare the hot melt adhesive composition of this example with two conventionally used hot melt adhesives, tensile strength tests at 100% elongation were performed at room temperature and at 100° F. The sample designated Sample A was the hot melt of the present example; Sample B, a conventional ethylene vinyl acetate/tackifier/plasticizer composition and Sample C a conventional atactic polypropylene adhesive reinforced with a tackifier.

| Sample | Tensile Strength (psi) | | |
|---|---|---|---|
| | A | B | C |
| Room Temperature | 115–120 | 40 | 65 |
| 100° F. | 45 | 17 | 25 |

EXAMPLES II-VI

Using the procedure described in Example I, the following hot melt adhesive compositions were prepared.

| | II | III* | IV | V* | VI |
|---|---|---|---|---|---|
| Ethylene-ethyl acrylate (18% ethyl acrylate) | 24 | 20.5 | 15 | — | — |
| Ethylene-vinyl acetate (18% vinyl acetate) | — | — | — | 30 | 27.5 |
| Atactic polypropylene | 30 | 29 | 35 | 25 | 22.5 |
| Arkon M100 (hydrogenated aromatic) | — | 43 | 45 | — | — |
| Nirez 1100 | 34 | — | — | — | — |
| Eastman H-130 (dicyclopentadiene) | — | — | — | 30 | — |
| Arkon P125 (hydrogenated dicyclopentadiene) | — | — | — | — | 42.5 |
| Polybutene | 4 | 5 | 5 | 5 | 5 |
| Paraffin Wax | 8 | 2.5 | — | 10 | 2.5 |
| BHT | 0.5 | 0.5 | 0.5 | 0.5 | 0.25 |
| DSTDP | 0.5 | 0.5 | 0.5 | 0.5 | 0.25 |

All the above compositions were characterized by superior bond strength, particularly at elevated temperatures. Those compositions marked with an asterik (*) are particularly suitable for multi-line diaper constructions.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A non-pressure sensitive hot melt adhesive composition consisting essentially of:
   (a) 10 to 40% by weight of a copolymer of ethylene with vinyl acetate or an alkyl acrylate wherein the vinyl acetate or alkyl acrylate comprises 5 to 25% by weight of the copolymer.
   (b) 10 to 40% by weight of atactic polypropylene; the weight ratio of atactic polypropylene to ethylene copolymer being between 0.5 and 2.5;
   (c) 20 to 50% by weight of a compatible tackifying resin;
   (d) 0 to 15% by weight of plasticizing oil;
   (e) 0 to 15% by weight of a petroleum derived wax; and
   (f) 0 to 1.5% stabilizer;
   and wherein the composition is characterized by a viscosity within the range of 1,000 to 10,000 cps. at 300° F.; a minimum open time of 5 seconds; and a minimum tensile strength at 100% elongation of 60 psi at room temperature and 30 psi at 100° F.

2. The hot melt adhesive composition of claim 1 wherein the ethylene copolymer is a copolymer of ethylene and vinyl acetate containing 10 to 18% vinyl acetate and having a melt index of about 10 to 500.

3. The hot melt adhesive composition of claim 1 wherein the ethylene copolymer is a copolymer of ethylene and an alkyl acrylate containing 1 to 6 carbon atoms in the alkyl radical.

4. The hot melt adhesive composition of claim 1 wherein the ethylene copolymer is a copolymer of ethylene and ethyl acrylate containing about 18% by weight of ethyl acrylate and having a melt index of 15 to 25.

5. The hot melt adhesive composition of claim 1 wherein the tackifying resin is selected from the group consisting of (1) natural and modified rosins; (2) glycerol and pentaerythritol esters of natural and modified rosins; (3) polyterpene resins having a softening point of from about 80° to 150° C.; (4) phenolic modified terpene resins; (5) aliphatic petroleum hydrocarbon resins having a Ball and Ring softening point of from about 70° to 135° C.; (6) aromatic petroleum hydrocarbon resins and the hydrogenated derivatives thereof; and (7) alicyclic petroleum hydrocarbon resins and the hydrogenated derivatives thereof.

6. The hot melt adhesive composition of claim 1 wherein the plasticizing oil is polybutene.

7. A non-pressure sensitive hot melt adhesive composition consisting essentially of:
   (a) 20 to 30% by weight of a copolymer of ethylene with vinyl acetate or an alkyl acrylate;
   (b) 20 to 40% by weight of atactic polypropylene; the weight ratio of atactic polypropylene to ethylene copolymer being between 0.5 and 2.5;
   (c) 35 to 50% by weight of a compatable tackifying resin;
   (d) 5 to 15% by weight of a plasticizing oil;
   (e) 0 to 5% by weight of a petroleum derived wax; and
   (f) 0 to 1.5% by weight of a stabilizer;
   and wherein the composition is characterized by a viscosity of 2000 to 8000 cps at 300° F., a minimum open time of 10 seconds, a minimum bonding temperature of 160° F. and a minimum tensile strength at room temperature of 60 psi and at 100° F. of 30 psi.

8. The hot melt adhesive composition of claim 7 wherein the ethylene copolymer is a copolymer of ethylene and ethyl acrylate containing about 18% by weight of ethyl acrylate and having a melt index of 15 to 25.

9. The hot melt adhesive composition of claim 7 wherein the tackifying resin is selected from the group consisting of (1) natural and modified rosins; (2) glycerol and pentaerythritol esters of natural and modified rosins; (3) polyterpene resins having a softening point of from about 80° to 150° C.; (4) phenolic modified terpene resins; (5) aliphatic petroleum hydrocarbon resins having a Ball and Ring softening point of from about 70° to 135° C.; (6) aromatic petroleum hydrocarbon resins and the hydrogenated derivatives thereof; and (7) alicyclic petroleum hydrocarbon resins and the hydrogenated derivatives thereof.

10. The hot melt adhesive composition of claim 7 wherein the plasticizing oil is polybutene.

11. A disposable assembly comprising at least one polyethylene or polypropylene substrate bonded to at least one non-woven substrate using the non-pressure sensitive hot melt composition of claim 1.

12. A multi-line type diaper construction comprising at least polyethylene or polypropylene substrate bonded to at least one non-woven substrate using a non-pressure sensitive hot melt composition consisting essentially of:
   (a) 20 to 30% by weight of a copolymer of ethylene with vinyl acetate or a lower alkyl acrylate;
   (b) 20 to 40% by weight of atactic polypropylene; the weight ratio of atactic polypropylene to ethylene copolymer being between 0.5 and 2.5;
   (c) 35 to 50% by weight of a compatable tackifying resin;
   (d) 5 to 15% by weight of a plasticizing oil;
   (e) 0 to 5% by weight of a petroleum derived wax; and
   (f) 0 to 1.5% by weight of a stabilizer;

and wherein the composition is characterized by a viscosity of 2000 to 8000 cps at 300° F., a minimum open time of 10 seconds, a minimum bonding temperature of 160° F. and a minimum tensile strength at room temperature of 100 psi and at 100° F. of 50 psi.

13. The multi-line type diaper construction of claim 12 wherein the ethylene copolymer is a copolymer of ethylene and ethyl acrylate containing about 18% by weight of ethyl acrylate and having a melt index of 15 to 25.

14. The multi-line type diaper construction of claim 12 wherein the tackifying resin is selected from the group consisting of (1) natural and modified rosins; (2) glycerol and pentaerythritol esters of natural and modified rosins; (3) polyterpene resins having a softening point of from about 80° to 150° C.; (4) phenolic modified terpene resins; (5) aliphatic petroleum hydrocarbon resins having a Ball and Ring softening point of from about 70° to 135° C.; (6) aromatic petroleum hydrocarbon resins and the hydrogenated derivatives thereof; and (7) alicyclic petroleum hydrocarbon resins and the hydrogenated derivatives thereof.

15. The multi-line type diaper construction of claim 12 wherein the plasticizing oil is polybutene.

* * * * *